(12) United States Patent
Kulkarni et al.

(10) Patent No.: US 10,819,598 B1
(45) Date of Patent: Oct. 27, 2020

(54) METERING MULTI-TENANT, MICROSERVICE ARCHITECTURE-BASED INTEGRATION SERVICE IN A CLOUD COMPUTING ENVIRONMENT

(71) Applicant: SAP SE, Walldorf (DE)

(72) Inventors: Gopalkrishna Kulkarni, Bangalore (IN); Daniel Ritter, Heidelberg (DE); Sumanth Kempegowda, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/544,087

(22) Filed: Aug. 19, 2019

(30) Foreign Application Priority Data

Jun. 28, 2019 (IN) .............................. 201911025755

(51) Int. Cl.
*H04L 12/26* (2006.01)
*H04L 29/08* (2006.01)
*H04L 12/14* (2006.01)
*H04L 12/24* (2006.01)

(52) U.S. Cl.
CPC ........ *H04L 43/062* (2013.01); *H04L 12/1432* (2013.01); *H04L 41/5096* (2013.01); *H04L 43/026* (2013.01); *H04L 43/067* (2013.01); *H04L 43/0817* (2013.01); *H04L 67/22* (2013.01)

(58) Field of Classification Search
CPC ... H04L 67/10; H04L 47/781; H04L 2209/56; G06Q 30/04; G06F 2009/45595; G06F 9/45558; G06F 9/5077; G06F 9/5072
See application file for complete search history.

(56) References Cited

U.S. PATENT DOCUMENTS

| | | | | |
|---|---|---|---|---|
| 10,084,721 | B2 * | 9/2018 | Biswas | G06F 9/5072 |
| 10,524,028 | B1 * | 12/2019 | Badola | G06F 11/3414 |
| 2011/0296023 | A1 * | 12/2011 | Ferris | G06F 9/5072 |
| | | | | 709/226 |
| 2012/0130556 | A1 * | 5/2012 | Marhoefer | G05B 15/02 |
| | | | | 700/291 |
| 2012/0131195 | A1 * | 5/2012 | Morgan | G06F 9/5072 |
| | | | | 709/226 |

(Continued)

*Primary Examiner* — Ninos Donabed
(74) *Attorney, Agent, or Firm* — Buckley, Maschoff & Talwalkar LLC

(57) ABSTRACT

According to some embodiments, methods and systems may be associated with a cloud computing environment having a plurality of integration tenants. An independent usage measurement component (e.g., a microservice or module) may periodically calculate measurable meter units for a particular integration tenant of the cloud computing environment. Examples of measurable meter units include a static analysis of integration artifacts, outbound calls from components, message bandwidth, a number of messages, a static count of integration content connections, etc. A central cloud performance metering service may receive the calculated measurable meter units from the independent usage measurement component and arrange for billing data to be generated based on the calculated measurable meter units in connection with creation of a plurality of components resulting in implementation of an integration service for the particular integration tenant.

19 Claims, 12 Drawing Sheets

(56) References Cited

U.S. PATENT DOCUMENTS

| | | | |
|---|---|---|---|
| 2012/0221696 A1* | 8/2012 | Ferris | H04L 67/10 709/223 |
| 2012/0297198 A1* | 11/2012 | Danezis | H04L 9/3218 713/179 |
| 2012/0311106 A1* | 12/2012 | Morgan | H04L 41/0813 709/220 |
| 2013/0061306 A1* | 3/2013 | Sinn | H04L 41/12 726/7 |
| 2013/0086235 A1* | 4/2013 | Ferris | G06F 9/505 709/223 |
| 2014/0379539 A1* | 12/2014 | Doddavula | G06Q 20/145 705/34 |
| 2015/0134485 A1* | 5/2015 | Kim | G06O 30/0623 705/26.41 |
| 2015/0254740 A1* | 9/2015 | Akolkar | B01F 3/1221 705/34 |
| 2015/0341229 A1* | 11/2015 | Richter | H04L 43/08 709/224 |
| 2016/0212064 A1* | 7/2016 | Biswas | H04L 67/10 |
| 2017/0279970 A1* | 9/2017 | Dyer | H04M 15/44 |
| 2018/0025403 A1* | 1/2018 | McKay | G06Q 30/0283 705/26.44 |
| 2019/0173753 A1* | 6/2019 | Correia e Costa | H04W 76/10 |

\* cited by examiner

US 10,819,598 B1

METERING MULTI-TENANT, MICROSERVICE ARCHITECTURE-BASED INTEGRATION SERVICE IN A CLOUD COMPUTING ENVIRONMENT

BACKGROUND

An enterprise may utilize a cloud computing environment to let users perform tasks. For example, the enterprise might let various users execute an application via the cloud computing environment to process purchase orders, adjust human resources information, generate invoices, etc. In some cases, the cloud computing environment will support multiple tenants and create applications using multiple microservices (e.g., one microservice might be associated with a user interface while another microservice handles database resources). Moreover, in a microservice architecture-based integration tenant, one or more multi-tenant applications me coordinate operations to achieve desired results. For example, an integration service may contain one or more integration artifacts, such as runtime Java Archive package files ("jars") that aggregate multiple Java class files and associated metadata and resources (e.g., text, images, etc.) into a single file for distribution, and an integration service provider (e.g., a cloud platform) may want to bill the customer on a per tenant basis in a consumption-based cloud model (i.e., a model in which a service is available with infinite resources (in theory) and the consumer is billed based on usage as opposed to a subscription model). Such a billing approach may be referred to as "metering" a tenant. Note that metering might measure various parameters, such as a static analysis of integration artifacts (e.g., a number of runtime jars), message bandwidth (e.g., on a daily basis), etc. Whatever parameters are measured, the process of billing an integration service (which is multi-tenant) is complex and may require a higher quality of service. If not provided via an automated software process, the metering process will be manual and error-prone—especially when a substantial number of users, tenants, microservices, etc. are involved.

It would therefore be desirable to provide metering for a multi-tenant, microservice architecture-based integration service in a cloud computing environment in a secure, automatic, and efficient manner.

SUMMARY

According to some embodiments, methods and systems may be associated with a cloud computing environment having a plurality of integration tenants. An independent usage measurement component (e.g., a microservice or module) may periodically calculate measurable meter units for a particular integration tenant of the cloud computing environment. Examples of measurable meter units include a static analysis of integration artifacts, outbound calls from components, message bandwidth, a number of messages, a static count of integration content connections, etc. A central cloud performance metering service may receive the calculated measurable meter units from the independent usage measurement component and arrange for billing data to be generated based on the calculated measurable meter units in connection with creation of a plurality of components resulting in implementation of an integration service for the particular integration tenant.

Some embodiments comprise: means for periodically calculating, by an independent usage measurement component, measurable meter units for a particular integration tenant of the cloud computing environment; means for receiving, at a central cloud performance metering service, the calculated measurable meter units from the independent usage measurement component; and means for arranging, by the central cloud performance metering service, for billing data to be generated based on the calculated measurable meter units in connection with creation of a plurality of components resulting in implementation of an integration service for the particular integration tenant.

Some technical advantages of some embodiments disclosed herein are improved systems and methods to provide metering for a multi-tenant, microservice architecture-based integration service in a cloud computing environment in a secure, automatic, and efficient manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Note that Integration as a Service ("IaaS") software is a different offering as compared to a normal application executing in a cloud computing environment. For example, a normal application typically has set of registered users for whom access can be allowed after a successful registration. In a cloud or multi-cloud platform (e.g., such as Cloud Foundry), normal applications can directly be allowed to be provisioned using simple application design and user management. The user who provisions the application can directly and easily use the application. However, an integration service in a cloud platform may have a component-based architecture that offers multiple applications (or a set of applications). For example, an integration design User Interface ("UI") may represent one component, while a monitoring UI is another component and a runtime working node is still another component. Together, these components (e.g., microservices or modules) may constitute integration service software.

Figure 1:
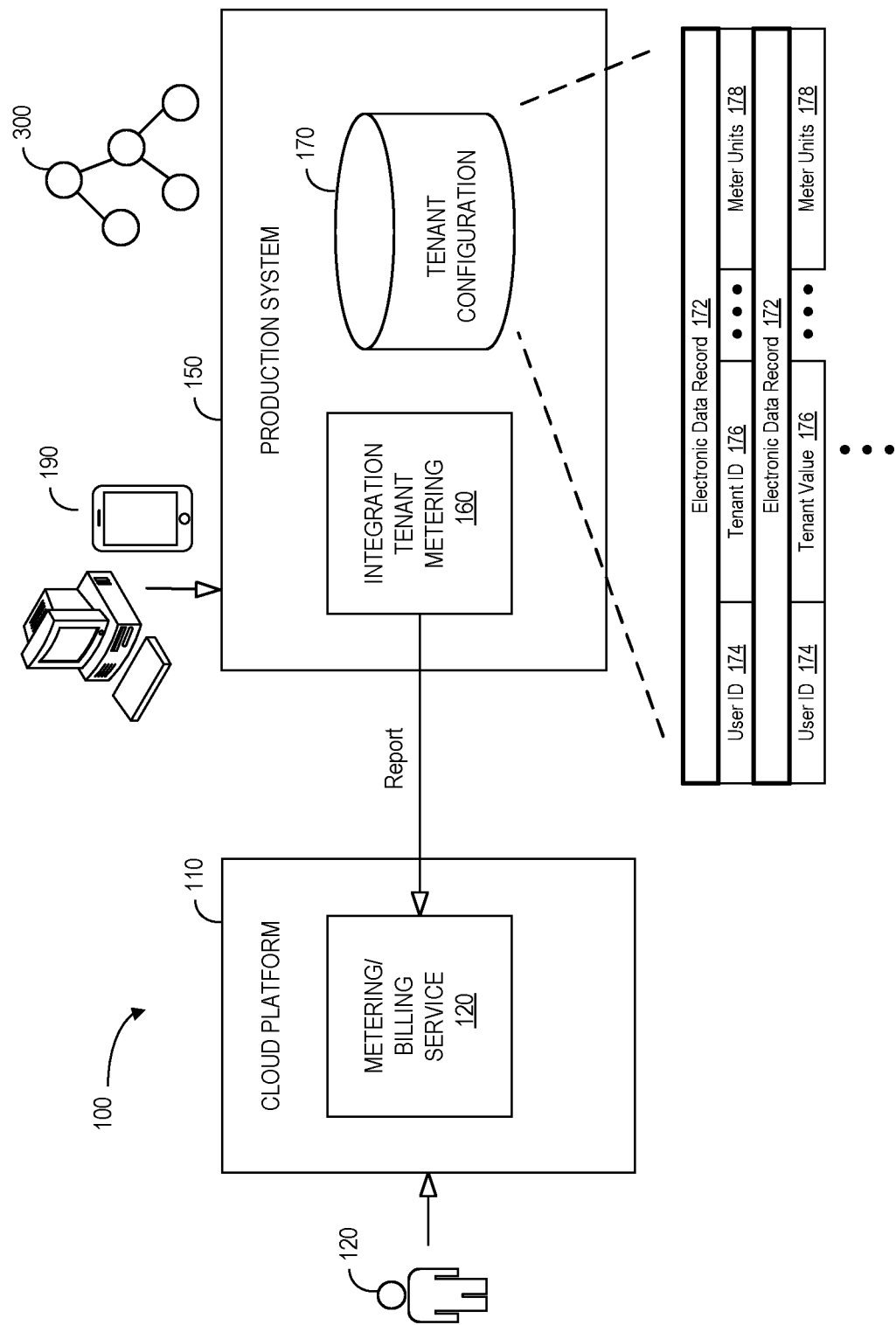
FIG. 1 is a high-level block diagram of a system in accordance with some embodiments.

In a cloud computing landscape, stand-alone, individual applications may be provisioned as a tenant. FIG. 1 is a high-level block diagram of a system 100 that provides an integration service 300. In particular, a production system 150 for a tenant stores tenant configuration 170 (e.g., with electronic data records 172 that each include a user identifier 174, a tenant identifier 176, meter units 178, etc.). A user 120 may then subscribe to various microservices and a runtime service/application may create the integration service 300 using the microservices. According to some embodiments, integration tenant metering 160 in the production system 150 and a metering/billing service in a cloud platform 110 may be used to bill the user 120 for use of the integration service 300. According to some embodiments, a remote operator or administrator device 190 may be used to configure or otherwise adjust the system 100.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The production system 150 may store information into and/or retrieve information from various data stores (e.g., the tenant configuration 170), which may be locally stored or reside remote from the production system 150. Although a single production system 150 is shown in FIG. 1, any number of such devices may be included. Moreover, various devices described herein might be combined according to embodiments of the present invention. For example, in some embodiments, the tenant configuration 170 and the production system 150 might comprise a single apparatus. The system 100 functions may be performed by a constellation of networked apparatuses, such as in a distributed processing or cloud-based architecture.

The user 120 may access the system 100 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters via the remote device 190 (e.g., to define how microservices interact) and/or provide or receive automatically generated recommendations or results associated with the system 100.

Figure 2:
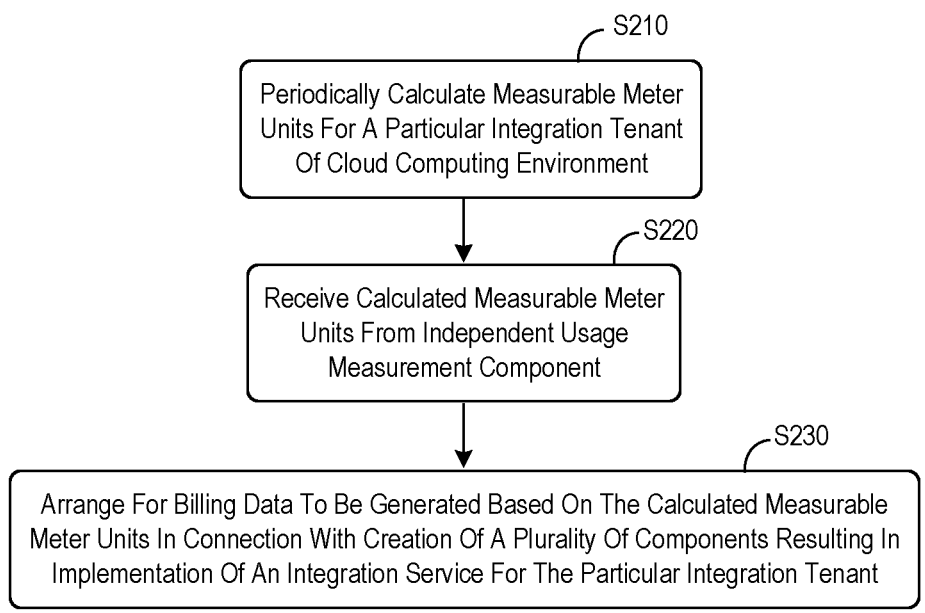
FIG. 2 is a method according to some embodiments.

FIG. 2 is a method that might performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, an independent usage measurement component may periodically calculate "measurable meter units" for a particular integration tenant of a cloud computing environment (e.g., on an hourly, daily, or weekly basis). Note that the independent usage measurement component might be associated with a microservice, a module, or any other type of component. Examples of microservices include an integration design user interface application, a monitoring user interface application, a runtime working node, an information storage service, database resources, etc. As used herein, the phrase "measurable meter units" might refer to, for example, a static analysis of integration artifacts (e.g., jars), outbound calls from components, message bandwidth, a number of messages, a static count of integration content connections, an amount of memory, a file size, a number of users, etc.

Figure 3:
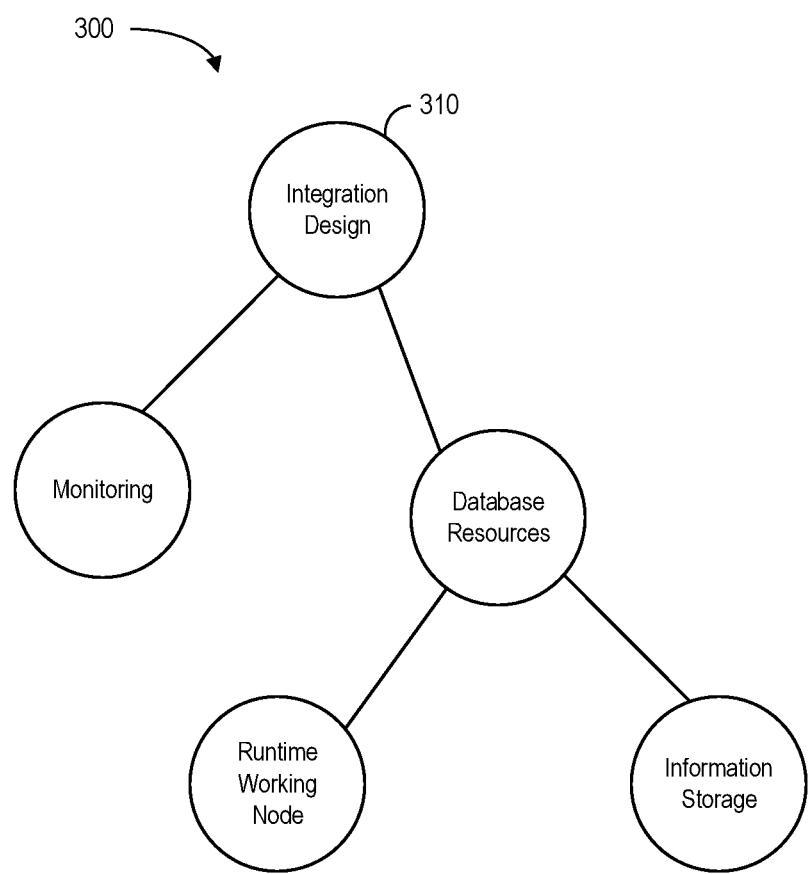
FIG. 3 is an example of an integration service in accordance with some embodiments.

At S220, a central cloud performance metering service may receive the calculated measurable meter units from the independent usage measurement component. At S230, the central cloud performance metering service may automatically arrange for billing data to be generated based on the calculated measurable meter units in connection with creation of a plurality of components (with the components resulting in implementation of an integration service for the particular integration tenant). As used herein, the term "automatically" may refer to a process that is performed with little or no human intervention. The integration service created with the component might be associated with, for example, a Software-as-a-Service ("SaaS") or a Platform-as-a-Service ("PaaS"). For example, FIG. 3 is an example of an integration service 300 associated with multiple microservice components 310 in accordance with some embodiments. Each microservice component 310 might be associated with, for example, an integration design UI application, a monitoring UI application, a runtime working node, an information storage service, database resources, etc. According to some embodiments, a platform resource manager processor may create tenant specific resources, create tenant specific instances, and/or bind applications to the resources and instances. According to some embodiments, metering statistics may be monitored for a plurality of integration tenants. Moreover, proof of the calculated measurable meter units may be captured (e.g., an audit log may record the calculated measurable meter units). In some embodiments, billing data is not generated for at least one tenant type (e.g., a "test" environment tenant).

Thus, embodiments may address the metering challenge by providing a dedicated component, such as a microservice, with set of built-in software abilities. According to some embodiments, cloud platforms may provide a centrally managed metering service and service providers all periodically publish usage data (e.g., on a daily or monthly basis). Note that any measurable quantity might be the source of the usage data. For example, an integration service tenant might use a static analysis of integration artifacts (jars) as a source of the usage data. In one embodiment, the total number of jars is considered as a quantity that can be metered or measured.

According to some embodiments, an independent, "high available" microservice may periodically calculate measurable meter units and send this data to a cloud platform metering service. Note that various sources of measuring metering units may be configured. For example, the measurable unit might be message bandwidth (i.e., a total number of messages sent and/or received by a tenant on a daily basis) or a static count of integration content connections to an outgoing call. According to some embodiments, an "exactly once" Quality of Service ("QoS") may be achieved for pushing metering units for a given tenant periodically to a central metering service. Moreover, some embodiments may monitor metering statistics for all integration tenants and/or document proof of metering unit capture (e.g., because a consumer may question the accuracy of metering units on a given day), such as by capturing integration artifacts and sources of metering units in an audit log on daily basis. Some embodiments may provide a convenient, safe, secure, robust, and automatic software service to capture metering units of an integration tenant. Note that metering might be ignored based on a tenant type. For example, it might not be necessary to bill all tenants (e.g., tenants used by an internal development team might not be metered)

Figure 4:
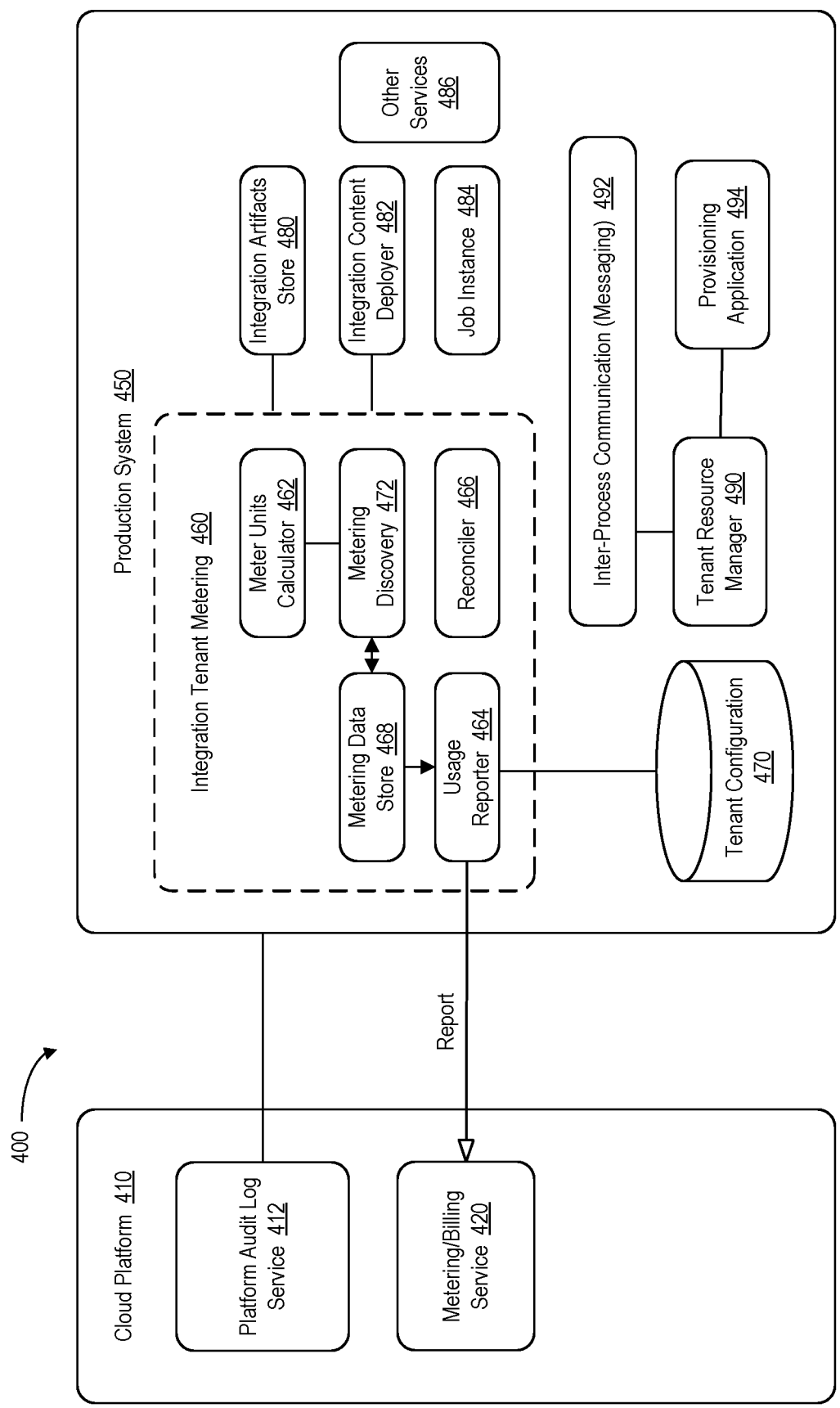
FIG. 4 is a more detailed high-level block diagram of a metering system in accordance with some embodiments.

FIG. 4 is a more detailed high-level block diagram of a metering system 400 in accordance with some embodiments. As before, the system 400 includes a production system 450 for a tenant that stores tenant configuration 470. A user may then subscribe to various microservices and a runtime service/application may create an integration service using the microservices. According to some embodiments, integration tenant metering 460 in the production system 450 and a metering/billing service 420 in a cloud platform 410 may be used to bill the user for use of the integration service. The integration tenant metering 460 may exchange information with, for example, an integration artifact store 480 and/or an integration content deployer 482. The production system 450 may further include job instances 484, other services 486, a tenant resource manager 490 (which might exchange information via inter-process communications 492 such as messaging), a provisioning application 494, etc.

Generally, in the cloud platform 410, services may be provisioned (e.g., subscribed) using a provisioning step. On invocation of this step, a tenant will be on-boarded by creating platform resources and other bindings for all the involved microservices. The integration tenant metering 460 may, according to some embodiments, be part of these microservices. It will listen to the provisioning step notification. Once it receives the notification, the integration tenant metering 460 may create a job to be run on a daily basis. The job may call the integration tenant metering 460 service's endpoint every day. On receiving this call, the integration tenant metering 460 may fetch all of the integration artifacts for that tenant. These artifacts will be given to one or more meter units calculator 462 components. According to some embodiments, a database may be used for efficient and reliable metering. After these calculations, the data will be stored in a metering data store 468 along with additional metadata about the integration artifact, such as the date it was created, when it was last modified, type of artifact, etc. that may be stored for accurate proof of the metering. A usage reporter 646 may understand the format of the report required by the cloud platform 410 metering/billing service 420 (note that for each cloud platform 410 the format may be different). In some embodiments, pre-built formatters of major cloud platforms may be provided. The usage reporter 646 may pick up the persisted data, generate a metering report, and send it to the cloud platform 410 metering/billing service 420. The cloud platform metering/billing service 420 may then send a final bill to the consumer.

Since billing is an important aspect of any business, embodiments may make sure to capture the meter without failures and store the exact values. In some cases, a metering job itself might not be triggered when a tenant is provisioned for some reason. In other cases, the usage reporter 464 may fail to push the report (e.g., because a billing service is down). In such cases, a reconciler 466 may also run periodically (it can be configured as daily, weekly, etc.). The reconciler 466 may fetch all of the tenants from a central source and check the metering data store 468 for consistency. If there is a mismatch (there are fewer jobs than tenants or fewer tenants than jobs), the metering data store 468 may be updated and jobs may be deleted (if required). A metering discovery 472 component may be responsible for listening to the provisioning notification and fetching the integration artifacts and metadata.

Some embodiments may persist the tenant configuration 470 at a central place. The tenant configuration 470 may store the tenant properties (e.g., is it a "TEST" tenant or a "PROD" tenant?). The usage reporter 464 may check the tenant property and act accordingly. Some embodiments may ignore/skip the billing for a certain type of tenant. For example, assume that the system 400 does not want to bill non-productive tenants. In this case, the usage reporter 464 may simply check the tenant configuration 470: if the tenant property is "PROD," then it pushes the data to metering/billing service 420; otherwise it is ignored. Note that this arrangement might be configurable. For example, a tenant administrator, during a provisioning step, may provide this information (via a user interface) and the information may be stored in the tenant configuration 470.

A cloud platform audit log service 412 may be used to log each of step of metering to provide a proof of accuracy for external auditors. According to some embodiments, the integration tenant metering 460 may execute the scenario in steps. For example, capturing the integration artifacts and metadata from external source might comprise one step. After successful capture, the metadata can be audit logged as received from a particular source during another step. After the meter units calculation 462, the result will be audit logged along with the integration metadata and linked to download the in-time integration artifact as still another step. This level of granular audit logging may help make the integration tenant metering 460 a robust service to handle the critical use case of billing.

Note that metering is generally in many services done by set of trivial metrics such as user registration, hardware procured, etc. But in the integration domain, a company may instead sell integration service and would be more interested in billing based on the usage of that service. Some embodiments described herein meter the usage by using various sources. One such source might comprise the integration content artifact itself (e.g., check the integration content and meter). Some embodiments provide a pluggable approach to add more sources of metrics calculation. Some embodiments provide sources of truth on the metered units (e.g., providing integration content available during the point of time the system metered the units). Some embodiments provide one dedicated module to offer the metrics discovery and submit the report in the format that a billing service expects. The format may differ for different platforms (which might be easily configured within the module).

Figure 5:
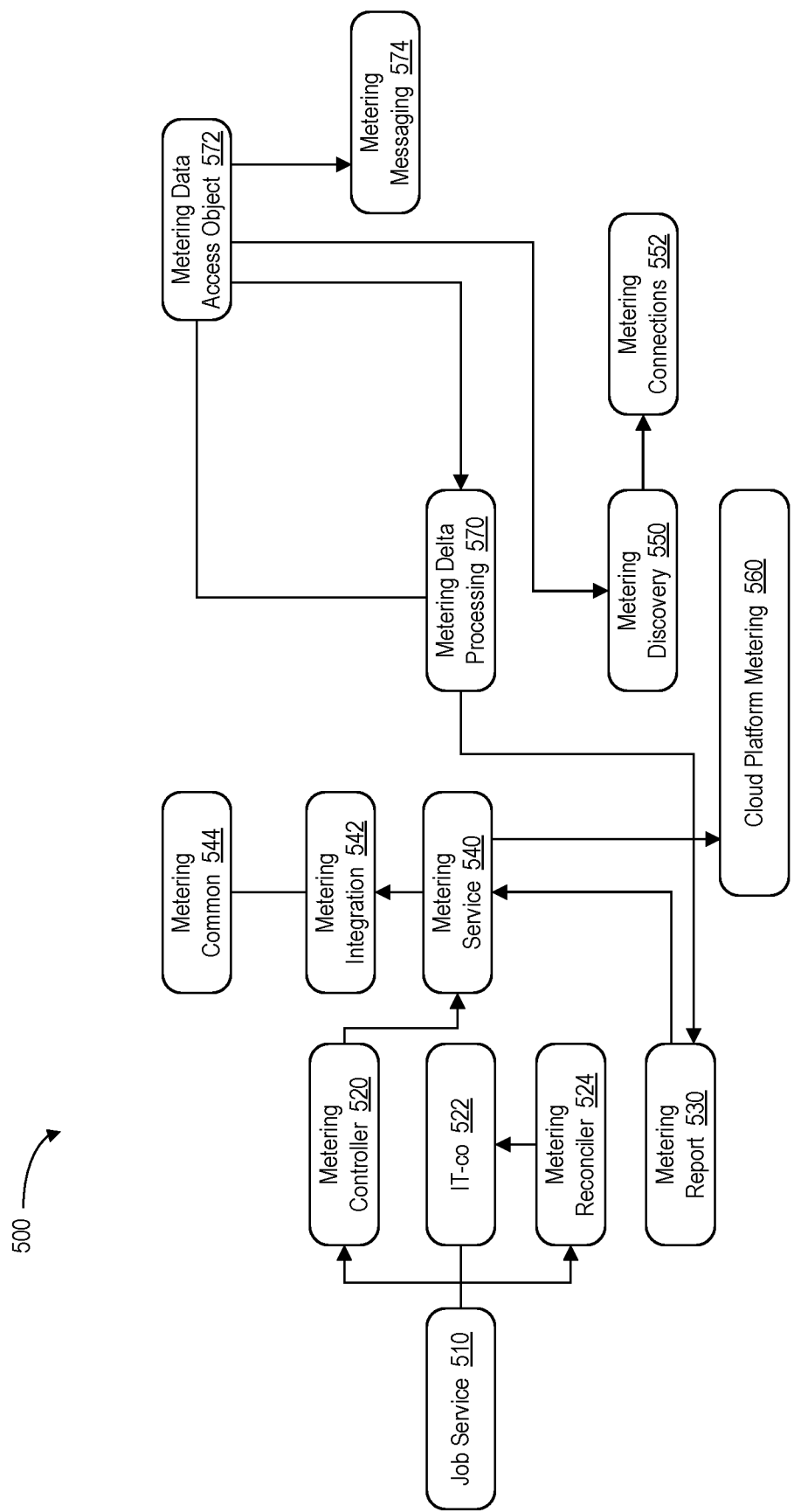
FIG. 5 illustrates metering components according to some embodiments.

FIG. 5 illustrates metering components 500 according to some embodiments. In particular, a job service may communicate with a metering controller 520 (e.g., containing an action endpoint for a job to trigger), an IT-co 522, and a metering reconciler 524 (e.g., to delete or add jobs as necessary). The metering controller 520 may provide information to a metering service 540 which communicates with a metering report 530, cloud platform metering 560, and a metering common 544 component (e.g., via metering integration 542). A metering data access object 572 (e.g., associated with PostGreSQL) may communicate with metering delta processing 570, metering messaging 574, and metering connections 552 (e.g., via metering discover 550).

Note that embodiments may keep two action end points to periodically trigger by a job or task framework. The first is an action endpoint/meter for metering calculation and report submission (e.g., to be performed every day). When a tenant is onboarded, the metering module may receive a notification and create a daily job for that tenant. While creating the job, it feeds the tenant identifier as the job data. This might be sent, for example, as a request payload on each call. The Integration Tenant ("it")-metering-controller 520 may extract the tenant identifier from the request payload, delegate metering calculation, and push to the it-metering-service 540. The second is an action endpoint/reconcile to reconcile missing jobs or deleted tenants. This might be set, for example, to once per week or two weeks. This component performs two things: (1) checking if there are any jobs missing for any tenants (e.g., by fetching all tenants and jobs, comparing to find out missing jobs and, if found, creating a new job); and (2) checking if the system is running jobs for a deleted tenant.

Figure 6:
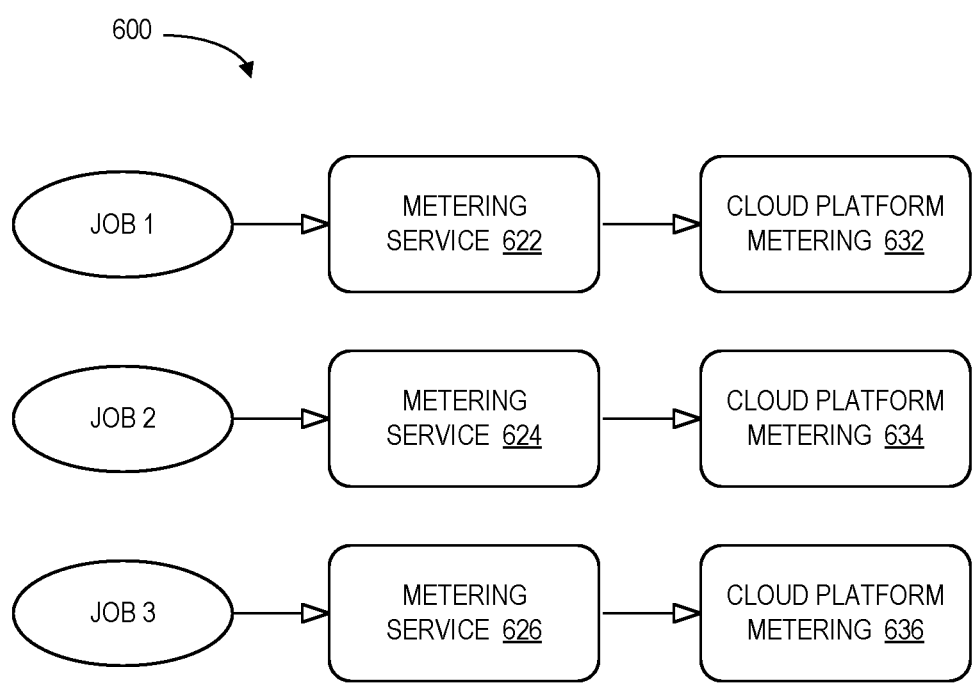
FIGS. 6 and 7 illustrate metering design approaches in accordance with some embodiments.
Figure 7:
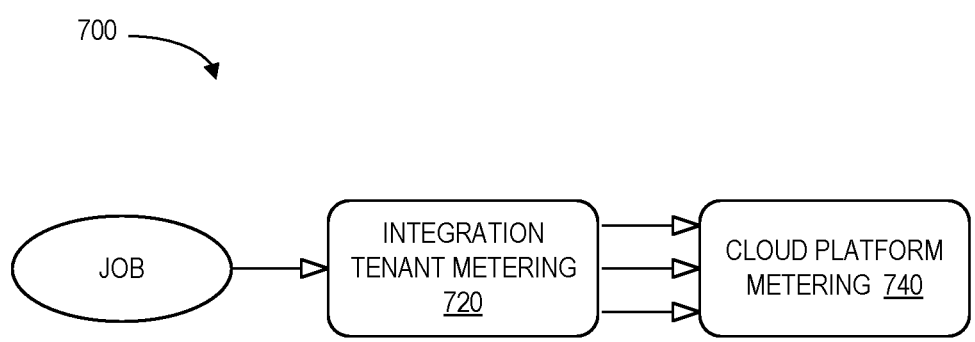

In some embodiments, a multi-tenant microservice termed as "it-metering" will calculate a connection count for a tenant and push this count to cloud platform metering every day. This service may be available one per system. In some cases, the QoS may be increased by offering a reconciliation before pushing the data every day (an attempt to re-send failed tenant data might be made, for example, every day). A job framework may be used to initiate the daily calculation and pushing. In some embodiments, simple alerting is supported. FIGS. 6 and 7 illustrate metering design approaches in accordance with some embodiments. In particular, FIG. 6 illustrates 600 one job instance per tenant. For example, "job 1" has a metering service 622 and cloud platform metering 632, "job 2" has a metering service 624 and cloud platform metering 634, and "job 3" has a metering service 626 and cloud platform metering 636. Such an approach may provide an ability to distribute the load in different time frames. Moreover, the approach may be simpler to implement because it does not need to fetch a list of all tenants and iterate over them one-by-one. (the tenant to be handled may be included as part of job data). Moreover, retry (if implemented) can be leveraged by using the job framework as the system gets enough data from job framework itself to know which tenant's jobs failed (possibility to offer a manual retry by reusing the job framework for a given tenant). One drawback of the approach of FIG. 6 is that it-metering may need to be made part of provisioning. This may add an additional point of failure to the provisioning flow FIG. 7 illustrates 700 an approach where this is one job instance per DC. Thus, a single job may be provided to integration tenant metering 720 which can have multiple interactions with cloud platform metering 740. In this case, the it-metering service may trigger a single job during bootup which caters to all the tenants. For example, consider there are three tenants available in a DC. A single job will be invoked which in turn results in three calls to the cloud platform metering 740 by the it-metering service 720. While this may eliminate the negative aspects of FIG. 6, it may have several disadvantages. For example, the system 700 require that it-metering 720 maintains a state. The single job invokes it-metering 720 service every day. For this call, a list of tenants will be fetched from a Tenant Resource Manager ("TRM") and for each tenant a thread may be spawned to calculate the connections and push the data to the cloud platform metering 740. Another disadvantage is that retry, if implemented, may need to be handled in it-metering 720. Moreover, from the job framework, a defined (non-modifiable) timeout may be set. The it-metering 720 may need to finish the metering push for all the tenants within this time-out (otherwise a completely asynchronous handling might need to be implemented).

Figure 8:
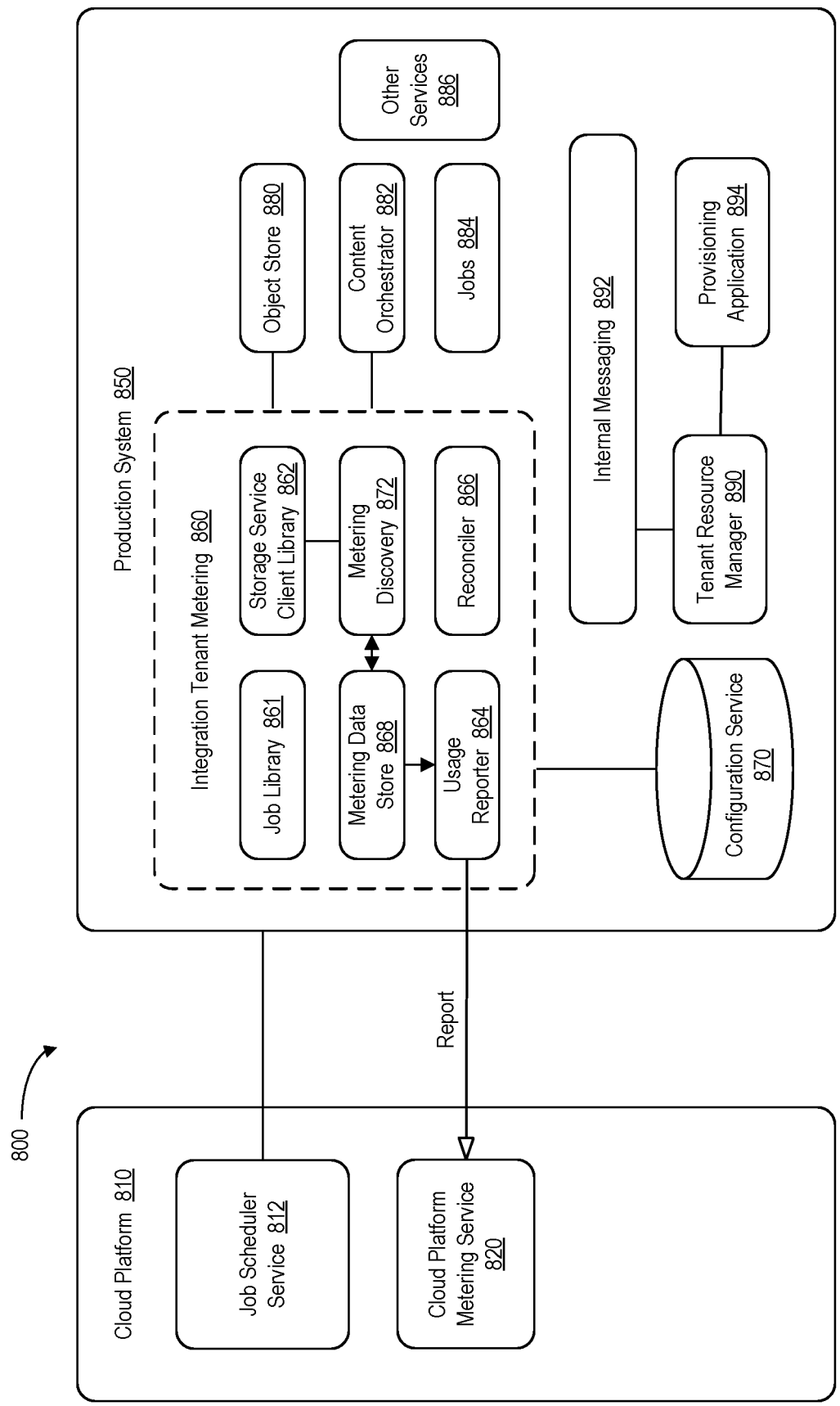
FIG. 8 is a metering architecture for a cloud platform in accordance with some embodiments.

Embodiments will be described herein using the approach of FIG. 6 (although any of the embodiments might instead utilize the approach of FIG. 7). FIG. 8 is a metering architecture for a cloud platform in accordance with some embodiments (e.g., embodiments associated with an open source CLOUD FOUNDRY® platform). As before, the system 800 includes a production system 850 for a tenant that stores configuration service 870. A user may then subscribe to various microservices and a runtime service/application may create an integration service using the microservices. According to some embodiments, integration tenant metering 860 in the production system 850 and a cloud platform metering service 820 in a cloud platform 810 may be used to bill the user for use of the integration service. The integration tenant metering 860 may exchange information with, for example, an object store 880 (e.g., associated with Simple Storage Service ("S3")) and/or content orchestrator 882. The production system 850 may further include jobs 884, other services 886, a tenant resource manager 890 (which might exchange information via internal messaging), a provisioning application 894, a TRM 890, etc.

The integration tenant metering 860 service of the production system 850 may further include a job library 861, a storage service client library 862, a usage reporter 864, a reconciler 866, a metering data store 868, and metering discovery 860. The cloud platform 810 may include a job schedule service 812 in addition to the cloud platform metering service 820. In this way, the it-metering 860 service will be part of the system 800 (one per system 800). Using it-jobs 884, a tenant-specific job will be created after listening to the tenant onboarding event from the TRM 890. This job's action endpoint will be it-metering service 860. On invoke, the it-metering service 860 will fetch all the binaries from a S3 bucket, calculate the connections (using a metering discovery 872 component), and submits the report to the cloud platform metering service 820.

According to some embodiments, an application may provide metering discovery on-the-fly. This will be deployed per system (for production systems). The it-metering 860 service will listen to the tenant on-boarding notification. On receiving the on-boarding notification, the existing job scheduler service (it-jobs) instance per tenant will be used to spin a new job for with a job action endpoint being it-metering 860 service itself. The job "connection meter" may be created for all tenant environments. The job created may contain a tenantId in a data field. This value may be sent to the metering discovery 872 endpoint with request body. For the first call, the metering discovery 872 will fetch the artifacts available from the S3 bucket using the tenantId and calculate and put the data for all artifacts in the it-metering store 868. The usage reporter 864 will fetch this data and push it to the cloud platform metering service 820. For subsequent calls (e.g., a second call from the job), only delta bundles need to be retrieved. The delta binary download may be achieved in various ways (using an API, metadata from S3, etc.).

Some embodiments may utilize the reconciler 866 for the following three use cases:

1. Making sure the tenant specific connection metering job is triggered—To reduce the failure points of provisioning, the system 800 may simply consume the on-boarding/termination notification by the it-metering 860 service. In some cases, the system 800 may miss the notification and tenant specific Job is not triggered. The Reconciler will check asynchronously). Since it-metering 860 has its own persistence, it will keep track of the job it created during on-boarding. This is also needed to support billing for existing tenants (without metering job)

2. Failed pushes to cloud platform metering—The job will be triggered once per day and for simplicity, the system 800 might not set a retry (or exponential back up). For any given failure to push the connection count to the cloud platform metering service 820, a failure task will be maintained. When the job wakes up the next day, this task will be attempted again. A persistent failure should be observed by means of sending an alert to an operator or administrator for manual investigation.

3. Failed to receive content deployment notification—For this use case, a query for the state of the tenant may be generated. The persistence choice might comprise, for example, a relational database or a PostGreSQL database. On the first job run for a tenant, all the binaries may be downloaded and parsed using the metering discovery 860 component. The parsed result may then be stored in the database. Later, the connection report will be generated using the database information alone and pushed to the cloud platform metering service 820. A failure to push the data will be stored in a reconcile table. For the next run, the pending count will be pushed first and then the system 800 may do the new calculation for that day. The it-metering 860 may be listening for events as appropriate. Each event data will be persisted. Only those binaries which are new or modified will be retrieved from the S3 and recalculated for latest metering count. On receiving an un-deploy event, that artifact entry may be deleted from the it-metering-store 868. The content orchestrator 882 will provide metadata of the artifacts. This metadata will be stored along with metering information. A reconciliation on undeployed bundles may be done before the system 800 generates the metering report according to some embodiments.

Figure 9:
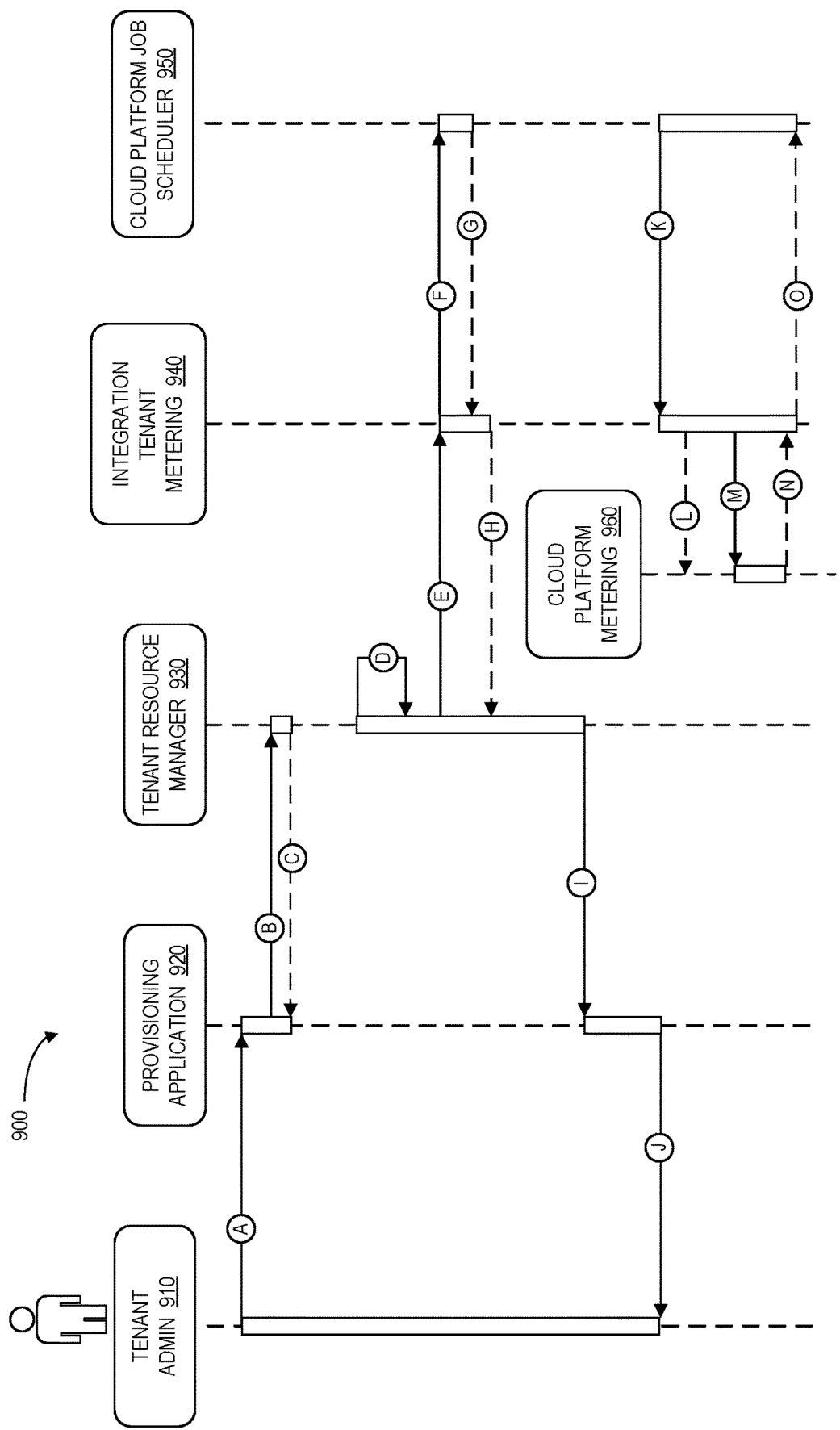
FIG. 9 is an information flow diagram of a metering process according to some embodiments.

FIG. 9 is an information flow diagram of a metering process 900 according to some embodiments. The process 900 includes a tenant administrator 910, a provisioning application 920, a Tenant Resource Manager ("TRM") 930, integration tenant metering 940, a cloud platform job scheduler 950, and cloud platform metering 960. At (A), the tenant administrator 910 sends a switch environment signal to the provisioning application 920. The provisioning application 920 then sends an update tenant configuration signal to the TRM 930 at (B) and receives a task identifier in return at (C). The TRM updates the tenant configuration data at (D) and sends a notification to it-metering 940 at (E). The it-metering 940 sends an update/delete job to the cloud platform scheduler 950 at (F) and receives a response in return at (G). This causes the it-metering 940 to transmit an acknowledgement to the TRM 930 at (H), resulting in a notification at task status being sent to the provisioning application 920 at (I). The provisioning application 920 then send an indication of success to the tenant administrator at (J).

The cloud platform job scheduler 950 may issue a call to the cloud platform metering 960 at (K). This results in a push to the cloud platform metering 960 at (L) and check status signal at (M). The cloud platform metering 960 response with a success signal at (N) which is then forwarded from it-metering 940 to the cloud platform job scheduler at (O).

Figure 10:
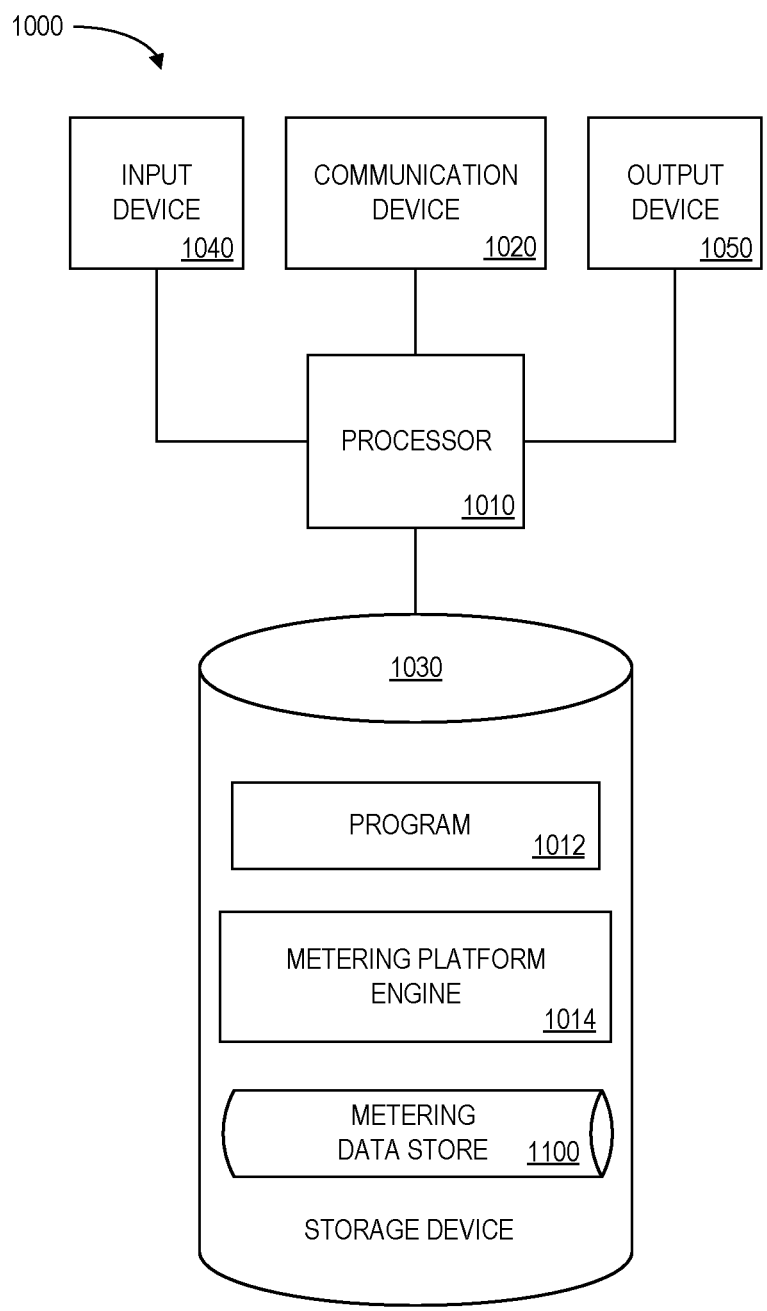
FIG. 10 is an apparatus or platform according to some embodiments.

Note that the embodiments described herein may also be implemented using any number of different hardware configurations. For example, FIG. 10 is a block diagram of an apparatus or platform 1000 that may be, for example, associated with the systems 100, 400 of FIGS. 1 and 4, respectively (and/or any other system described herein). The platform 1000 comprises a processor 1010, such as one or more commercially available Central Processing Units ("CPUs") in the form of one-chip microprocessors, coupled to a communication device 1060 configured to communicate via a communication network (not shown in FIG. 10). The communication device 1060 may be used to communicate, for example, with one or more remote user platforms, administrator platforms, etc. The platform 1000 further includes an input device 1040 (e.g., a computer mouse and/or keyboard to input microservice information) and/an output device 1050 (e.g., a computer monitor to render a display, transmit recommendations, and/or create reports about integration services, tenants, users, etc.). According to some embodiments, a mobile device, monitoring physical system, and/or PC may be used to exchange information with the platform 1000.

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1012 and/or metering platform engine 1014 for controlling the processor 1010. The processor 1010 performs instructions of the programs 1012, 1014, and thereby operates in accordance with any of the embodiments described herein. For example, the processor 1010 may be associated with an independent usage measurement component (e.g., a microservice or module) and may periodically calculate measurable meter units for a particular integration tenant of the cloud computing environment. Examples of measurable meter units include a static analysis of integration artifacts, outbound calls from components, message bandwidth, a number of messages, a static count of integration content connections, etc. The processor 1010 may receive the calculated measurable meter units from the independent usage measurement component and arrange for billing data to be generated based on the calculated measurable meter units in connection with creation of a plurality of components resulting in implementation of an integration service for the particular integration tenant.

The programs 1012, 1014 may be stored in a compressed, uncompiled and/or encrypted format. The programs 1012, 1014 may furthermore include other program elements, such as an operating system, clipboard application, a database management system, and/or device drivers used by the processor 1010 to interface with peripheral devices.

As used herein, information may be "received" by or "transmitted" to, for example: (i) the platform 1000 from another device; or (ii) a software application or module within the platform 1000 from another software application, module, or any other source.

In some embodiments (such as the one shown in FIG. 10), the storage device 1030 further stores a metering data store 1100. An example of a database that may be used in connection with the platform 1000 will now be described in detail with respect to FIG. 11. Note that the database described herein is only one example, and additional and/or different information may be stored therein. Moreover, various databases might be split or combined in accordance with any of the embodiments described herein.

Figure 11:
FIG. 11 is portion of a metering data store in accordance with some embodiments

Referring to FIG. 11, a table is shown that represents the metering data store 1100 that may be stored at the platform 1000 according to some embodiments. The table may include, for example, entries identifying users who may request integrations services associated with a cloud computing environment. The table may also define fields 1102, 1104, 1106, 1108, 1110 for each of the entries. The fields 1102, 1104, 1106, 1108, 1110 may, according to some embodiments, specify: a user identifier 1102, a tenant identifier 1104, an integration service identifier 1106, microservices 1108, and measurable meter units 1110. The metering data store 1100 may be created and updated, for example, when new users or tenants are added to a system, entitlement rules change, etc.

The user identifier 1102 might be a unique alphanumeric label that is associated with a user who may request an integration service associated with a cloud computing environment. The tenant identifier 1104 may represent an enterprise, group of users, etc. who utilize the cloud computing environment. The integration service identifier 1106 may define an application (e.g., a payroll or human resources application) composed of a number of different microservices 1108 (or, in some embodiments, modules or other types of components). The measurable meter units 1110 may be any measurement that can be quantified and used to bill users or tenants. For example, the measurable meter units 1110 might be associated with a static analysis of integration artifacts (e.g., jars), outbound calls from components, message bandwidth, etc.

Figure 12:
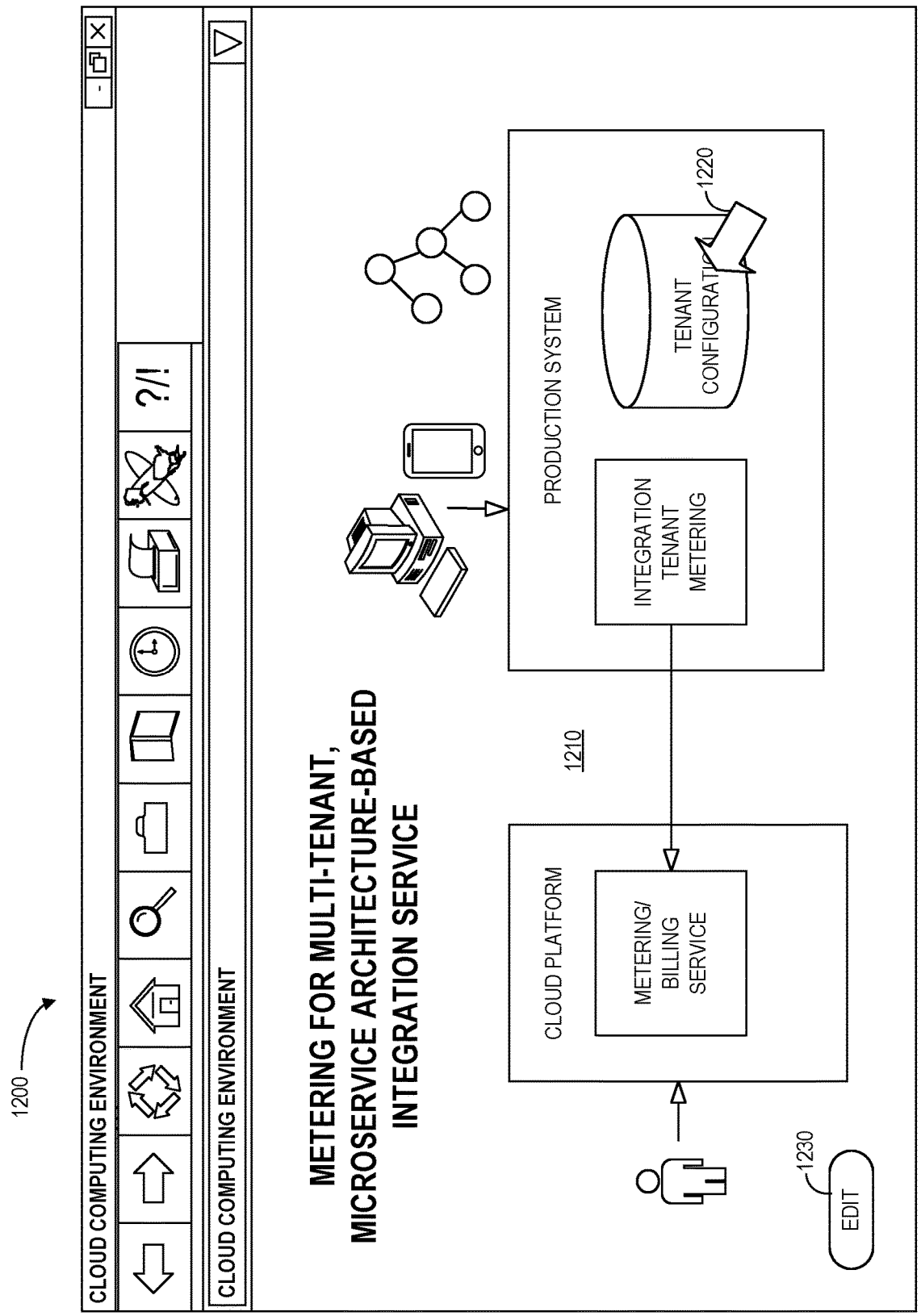
FIG. 12 is a human machine interface display according to some embodiments.

FIG. 12 is a human machine interface display 1200 in accordance with some embodiments. The display 1200 includes a graphical representation 1210 of a metering system in accordance with any of the embodiments described herein. Selection of an element on the display 1200 (e.g., via a touch-screen or computer pointer 1220) may result in display of a pop-up window containing more detailed information about that element and/or various options (e.g., to add a microservice, modify metering rules, adjust tenant configuration information, etc.). Selection of an "Edit" icon 1230 may also let an operator or administrator adjust the operation of the metering system (e.g., to change a billing rate associated with a particular measurable meter unit, tenant, tenant type, etc.).

Thus, embodiments may provide metering for a multi-tenant, microservice architecture-based integration service in a cloud computing environment in a secure, automatic, and efficient manner.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of integration services and microservices, any of the embodiments described herein could be applied to other types of applications. Moreover, the displays shown herein are provided only as examples, and any other type of user interface could be implemented. Note that some embodiments employ a static analysis of measurable meter units. However, embodiments may instead be associated with substantially real-time measurements and analysis. In addition, a dedicated alerting feature might look for inconsistencies between a final generated bill and the measured connections for a client (e.g., as a result of non-productive tenants). As another example, embodiments may be integrated with disaster recovery processes (e.g., to maintain billing continuity when a data center failover occurs).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a cloud computing environment having a plurality of integration tenants, comprising:
a metering discovery component to fetch integration artifacts and metadata when a metering request is detected;
an independent usage measurement component to periodically calculate measurable meter units for a particular integration tenant of the cloud computing environment, wherein the measurable meter units include an analysis of the integration artifacts, outbound calls from components, and message bandwidth, wherein an audit log is recorded to capture proof of the calculated measurable meter units; and
a central cloud performance metering service, including:
a computer processor,
and a computer memory, coupled to the computer processor, storing instructions that when executed by the computer processor cause the central cloud performance metering service to:
receive the calculated measurable meter units from the independent usage measurement component,
generate billing data based on the metadata and the calculated measurable meter units in connection with creation of a plurality of components resulting in implementation of an integration service for the particular integration tenant, and
transmit the billing data for the particular integration tenant.

2. The system of claim 1, wherein the independent usage measurement component is associated with a microservice.

3. The system of claim 2, wherein the microservice is associated with at least one of: (i) an integration design user interface application, (ii) a monitoring user interface application, (iii) a runtime working node, (iv) an information storage service, and (v) database resources.

4. The system of claim 3, wherein the integration service is associated with at least one of: (i) a Software-as-a-Service, and (ii) a Platform-as-a-Service.

5. The system of claim 1, wherein the measurable meter units further include at least one of: (i) a number of messages, (ii) a static count of integration content connections, (iii) an amount of memory, (iv) a file size, and (v) a number of users.

6. The system of claim 1, wherein an exactly once quality of service is provided for pushing the calculated measurable meter units associated with the particular integration tenant to the central cloud performance metering service.

7. The system of claim 1, wherein metering statistics are monitored for the plurality of integration tenants.

8. The system of claim 1, wherein billing data is not generated for at least one tenant type.

9. The system of claim 1, further comprising:
a usage reporter to interpret a format of a report associated with the central cloud performance metering service.

10. The system of claim 1, further comprising:
a reconciler to periodically fetch tenant data and compare the fetched data with information in a metering data store.

11. The system of claim 1, further comprising:
a metering discovery component to fetch integration artifacts and metadata when a metering request is detected.

12. A non-transitory, computer-readable medium having executable instructions stored therein, the medium comprising:
Instructions to fetch, by a metering discovery component, integration artifacts and metadata when a metering request in detected;
instructions to periodically calculate, by an independent usage measurement component, measurable meter units for a particular integration tenant of a cloud computing environment, wherein the measurable meter units include an analysis of the integration artifacts, outbound calls from components, and message bandwidth, wherein an audit log is recorded to capture proof of the calculated measurable meter units;
instructions to receive, at a computer processor of a central cloud performance metering service, the calculated measurable meter units from the independent usage measurement component;
instructions to generate, by the computer processor of the central cloud performance metering service, billing data based on the metadata and the calculated measurable meter units in connection with creation of a plurality of components resulting in implementation of an integration service for the particular integration tenant; and
instructions to transmit, by the computer processor of the central cloud performance metering service, the billing data for the particular integration tenant.

13. The medium of claim 12, wherein the independent usage measurement component is associated with a microservice.

14. The medium of claim 13, wherein the microservice is associated with at least one of: (i) an integration design user interface application, (ii) a monitoring user interface application, (iii) a runtime working node, (iv) an information storage service, and (v) database resources.

15. The medium of claim 14, wherein the integration service is associated with at least one of: (i) a Software-as-a-Service, and (ii) a Platform-as-a-Service.

16. A computer-implemented method associated with a cloud computing environment having a plurality of integration tenants, comprising:
fetching, by a metering discovery component, integration artifacts and metadata when a metering request in detected;
periodically calculating, by an independent usage measurement component, measurable meter units for a particular integration tenant of the cloud computing environment, wherein the measurable meter units include an analysis of the integration artifacts, outbound calls from components, and message bandwidth, wherein an audit log is recorded to capture proof of the calculated measurable meter units;
receiving, at a computer processor of a central cloud performance metering service, the calculated measurable meter units from the independent usage measurement component;
generating, by the computer processor of the central cloud performance metering service, billing data based on the metadata and the calculated measurable meter units in connection with creation of a plurality of components resulting in implementation of an integration service for the particular integration tenant; and
transmitting, by the computer processor of the central cloud performance metering service, the billing data for the particular integration tenant.

17. The method of claim 16, wherein the measurable meter units further include at least one of: (i) a number of messages, (ii) a static count of integration content connections, (iii) an amount of memory, (iv) a file size, and (v) a number of users.

18. The method of claim 16, wherein an exactly once quality of service is provided for pushing the calculated measurable meter units associated with the particular integration tenant to the central cloud performance metering service.

19. The method of claim 16, wherein metering statistics are monitored for the plurality of integration tenants.

* * * * *